United States Patent [19]

Flenniken

[11] 4,189,875
[45] Feb. 26, 1980

[54] HARVESTER CUTTERHEAD KNIFE SHARPENING DEVICE

[75] Inventor: John M. Flenniken, Senonches, France

[73] Assignee: Deere & Company, Moline, Ill.

[21] Appl. No.: 923,266

[22] Filed: Jul. 10, 1978

[51] Int. Cl.$^2$ ............................................. B24B 19/00
[52] U.S. Cl. ..................................... 51/250; 83/174.1
[58] Field of Search ................... 51/246, 250; 56/250, 56/12.1; 83/174.1, 174, ; 76/82.1; 241/101.2

[56] References Cited

U.S. PATENT DOCUMENTS

| 3,331,167 | 7/1967 | Hoch | 51/246 |
|---|---|---|---|
| 3,370,628 | 2/1968 | Waldrop | 51/250 |
| 3,677,316 | 7/1972 | Markham | 51/250 |

FOREIGN PATENT DOCUMENTS

1009259 9/1957 Fed. Rep. of Germany ............. 83/174

*Primary Examiner*—Othell M. Simpson
*Assistant Examiner*—Roscoe V. Parker

[57] ABSTRACT

A forage harvester includes a rotary cylinder-type cutterhead mounted in a housing and having a plurality of knives with cutting edges that generate a cylinder as the cutterhead rotates. A sharpening mechanism for the knives includes a pair of closed housings mounted on the opposite side walls of the cutterhead housing and a support member extending between said housings adjacent the cutterhead housing periphery, the opposite ends of the support member extending through openings in the housings and into the housing interiors. The openings are substantially larger than the support member to permit adjustment of the support member toward and away from the cutterhead periphery, and a pair of flexible seals are interposed between the ends of the support members and the respective housings to seal said openings. A manually rotatable crankshaft extends between the opposite housings and worm gearing connects the crankshaft to a threaded rod in each of the housings, each of said rods being threadable in one end of the support so that roration of the crankshaft causes adjustment of the support member toward and away from the cutterhead. A carrier is slidably mounted on the support member through a linear ball bearing and a sharpening stone is bonded to the carrier adjacent the cutterhead periphery, the carrier being reciprocatable back and forth along the support member by means of handle extending through the cutterhead housing side wall, so that the stone can be reciporcated back and forth across the width of the cutterhead as it is brought into engagement with the cutterhead knives by rotating the crankshaft. An interlock between the crankshaft and a door in the cutterhead housing prevents rotation of the crankshaft unless the housing door is closed.

9 Claims, 7 Drawing Figures

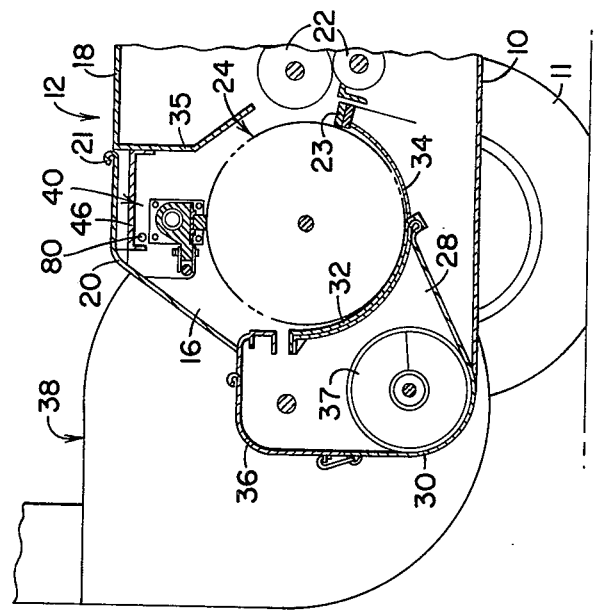

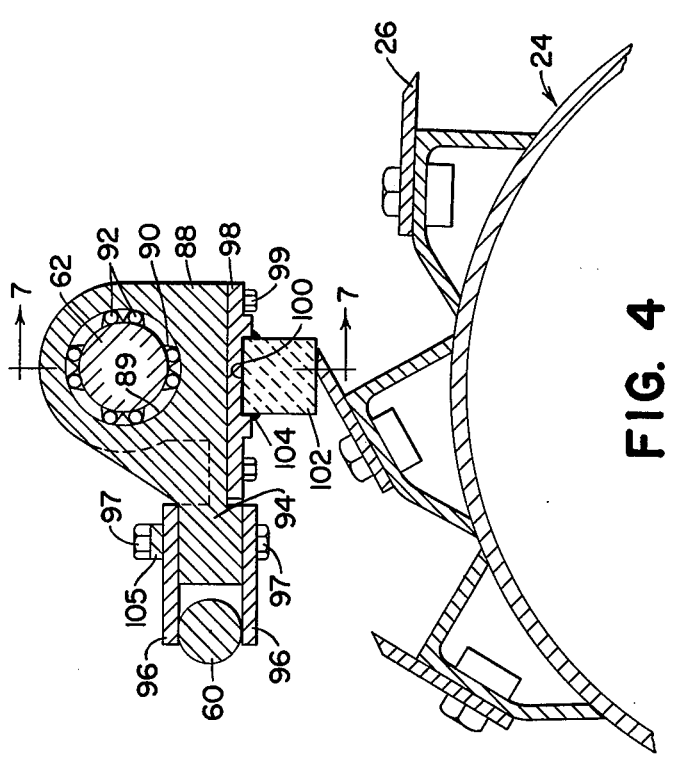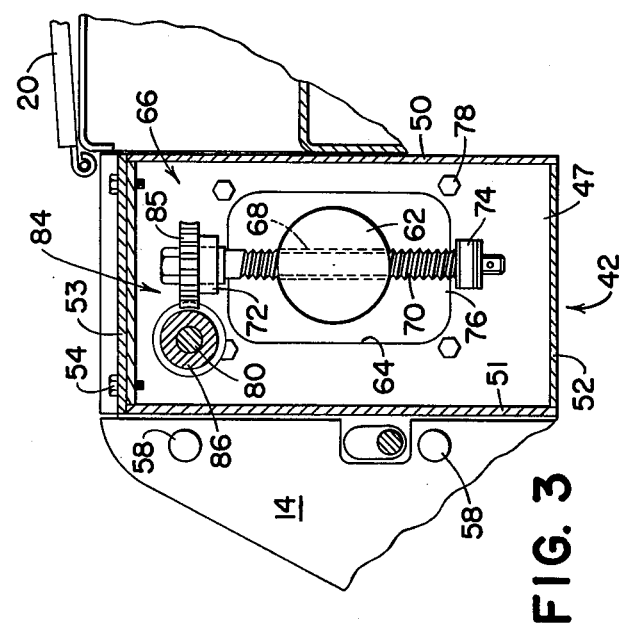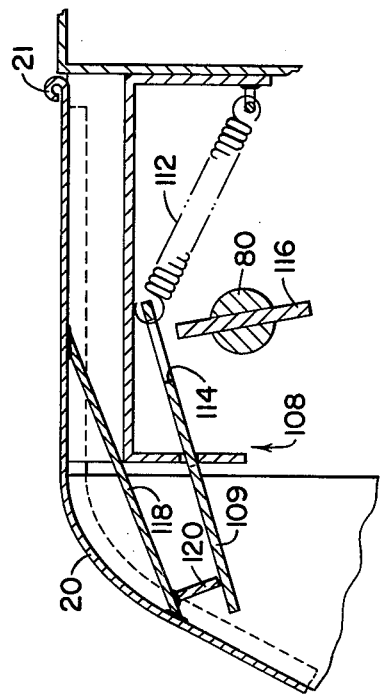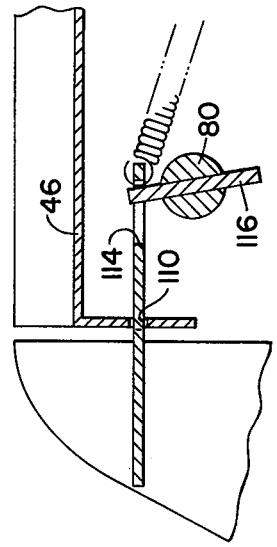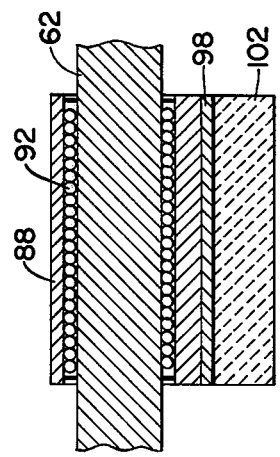

HARVESTER CUTTERHEAD KNIFE SHARPENING DEVICE

BACKGROUND OF THE INVENTION

This invention relates to a forage harvester and more particularly to an improved sharpening mechanism for sharpening the knives of the forage harvester cutterhead.

As is well known, sharp knives on a forage harvester cutterhead are essential for the efficient operation of the machine, and during operation of the machine, the knives should be sharpened at relatively frequent intervals, in some cases at least once a day. To that end, it is known to provide a knife sharpening device as an integral part of a forage harvester, so that the knives can be sharpened in the field without removing the knives or adding separate sharpening attachments. Such integral sharpening devices have generally taken the form of a grinding stone mounted in a carrier that is adjustable toward and away from the cutterhead periphery, the carrier also being reciprocatable across the width of the cutterhead. To sharpen the knives, the grinding stone is brought into engagement with the cutterhead periphery as the cutterhead is rotated and the grinding stone is then reciprocated back and forth across the width of the cutterhead to remove material from the cutterhead periphery and resharpen the knife cutting edges. As described in U.S. Pat. No. 3,677,316, it has been found highly desirable to rotate the cutterhead in a reverse direction during the sharpening process, a sharpening mechanism of the above general type being described in said patent wherein the sharpening stone is mounted in a carrier that is slidable along a supporting structure that is shiftable toward and away from the cutterhead periphery by means of a crank extending downwardly through the top of the cutterhead housing, the carrier being moved back and forth across the width of the cutterhead by means of handle that is manipulated by an operator standing alongside the cutterhead housing. Additional sharpening mechanisms of the above general type are shown in U.S. Pat. Nos. 3,331,167 and 3,370,628.

It is conventional in such machines to provide an access door in the cutterhead housing to provide access to the cutterhead. During the sharpening process, the operator is tempted to leave the access door open to observe the sharpening process, exposing himself to danger not only from the rotating cutterhead but also from the material expelled from the cutterhead during the sharpening process.

SUMMARY OF THE INVENTION

According to the present invention, there is provided an improved sharpening mechanism for sharpening the knives of a forage harvester cutterhead on the machine while the cutterhead is being rotated. More particularly, the improved sharpening mechanism features a grinding stone that is reciprocated back and forth across the width of the cutterhead while the stone is brought into engagement with the knife edges at the cutterhead periphery by adjustment of these supporting mechanism for the carrier that supports the stone.

An important feature of the invention resides in the provision of an interlock between the access door and the sharpening mechanism to prevent the shifting of the grinding stone into engagement with the cutterhead unless the access door is closed. Also according to the invention, the interlock is operative only to prevent adjustment of the stone toward the cutterhead, allowing movement of the stone away from the cutterhead when the door is open.

BRIEF DESCRIPTION OF THE DRAWINGS

FIG. 1 is a somewhat schematic vertical fore and aft section through the cutterhead housing of a forage harvester embodying the invention.

FIG. 2 is a right rear perspective of the cutterhead housing with the access door for the cutterhead in an open condition to expose the sharpening mechanism.

FIG. 3 is an enlarged vertical fore and aft section of the housing for the adjusting mechanism as viewed along the line 3—3 of FIG. 2.

FIG. 4 is an enlarged vertical fore and aft section through a portion of the cutterhead and the sharpening mechanism.

FIG. 5 is an enlarged vertical fore and aft section through the upper rear portion of the cutterhead housing showing the sharpening mechanism in a locked condition when the cutterhead housing door is in an open condition. FIG. 6 is a view similar to FIG. 5 but showing the housing door in a closed condition and the mechanism in its unlocked condition.

FIG. 7 is an enlarged section through the sharpening stone as viewed along the line 7—7 of FIG. 4.

DESCRIPTION OF THE PREFERRED EMBODIMENT

The invention is embodied in a pull-type forage harvester, only the rearward portion of which is shown in FIG. 1, the harvester including a mobile main frame 10 mounted on a pair of laterally spaced wheels 11, with only the left wheel being shown in FIG. 1. As is well known, such machines conventionally include a fore and aft tongue at the left side of the main frame that is connected to a towing tractor, which also supplies the power for the machine.

Mounted on the right side of the frame 10 is a cutterhead housing 12 that includes opposite upright left and right side walls 14 and 16, a generally horizontal top wall 18, and a door 20 that spans the width of the housing between the opposite side walls at the rearward end of the top wall, the door having a horizontal forward portion and a downwardly and rearwardly inclined rear portion to provide access to the cutterhead housing interior from the top and the rear. As is apparent, the door 20 swings upwardly and forwardly about a transverse hinge 21 at the forward end of the door.

A harvesting header is conventionally mounted on the forward end of the cutterhead housing 12 and operates to remove crop material from the field and deliver it rearwardly through a forward inlet opening to a set of feed rolls 22 only the rearward feed rolls 22 being shown in the drawings. The feed rolls feed the crop material rearwardly over a transverse shear bar 23 and into a rotary cylinder type cutterhead 24 that includes a plurality of knives 26 with cutting edges at the cutterhead periphery that generate a cylinder as the cutterhead rotates and register with the shear bar 23. The cutterhead includes a relatively large number of short knives mounted on a drum and is described in greater detail in U.S. Pat. No. 4,061,284, also assigned to the assignee herein.

The cutterhead reduces crop material as it is fed into the cutterhead and discharges it through a rearward discharge opening 28 in the cutterhead housing to an auger housing 30 rearwardly of the discharge opening. A grate or recutter screen 32 is mounted over the discharge opening to further reduce crop material before it passes to the auger housing. An arcuate band 34 closes the space between the shear bar 23 and the forward end of the grate 32, and a generally vertical bulkhead 35 close the front of the cutterhead housing between the upper rear feedroll 22 and the top wall 18. The auger housing 30 includes a door 36 below and to the rear of the door 20 to provide access to the recutter screen 32. A transversely extending auger 37 is disposed in the bottom of the housing 30 and operates to deliver material laterally on the machine from the cutterhead to a blower-type elevator 38 at the left side of the machine, the elevator discharging the crop material into an accompanying collector vehicle as is well known.

Mounted in the cutterhead housing above the cutterhead 24 is a knife sharpening mechanism, indicated in its entirety by the numeral 40. The sharpening mechanism includes right and left upright rectangular housings 42 and 44 respectively disposed adjacent the opposite side walls 14 and 16 and connected by a transverse inverted channel shaped member 46 that spans the width of the cutterhead housing immediately below the forward end of the door 20. The housings 42 and 44 are essentially mirror images of one another, so only the right housing 42 will be described in detail said housing including an upright inner wall 47, that includes a rearwardly extending flange 48 that overlaps and is disposed adjacent to the inner side of the cutterhead housing side wall, an upright fore and aft outer wall 49 spaced outwardly of the cutterhead housing side wall, an upright transverse front wall 50, an upright transverse rear wall 51, a generally horizontal bottom wall 52, and a removable top wall 53 that is connected to the rest of the housing by a pair of removable bolts 54 to provide access to the housing interior. The cutterhead housing side wall has a generally rectangular opening 56 that conforms to the shape of the sharpening mechanism housing and the housing is removably attached to the cutterhead housing side wall by mounting bolts 58 that extend through the inner wall flange 48 and the cutterhead housing side wall. As is apparent, the entire sharpening mechanism 40 can be removed from the harvester by simply removing the mounting bolts 58 and pulling the mechanism upwardly from the cutterhead housing side wall openings 56, although the housings 42 and 44 and the member 46 form a part of the cutterhead housing when the sharpening mechanism is in place. A transverse guide shaft 60 extends between the rearward ends of the inner wall flanges 48 of the opposite housings and further acts to tie the two housings together, the guide shaft having a circular cross section and being axially parallel to the axis of the cutterhead. A transverse support member 62 also spans the width of the cutterhead housing forwardly of the guide shaft 60, the suppport member 62 also having a circular cross section and being axially parallel to the cutterhead. The inner walls 47 of the opposite housings have rectangular openings 64 that receive the opposite ends of the support member 62, the ends of the support member being disposed on the interior of the respective housings. An adjusting mechanism, indicated generally by the numeral 66, supports each end of the support member 62 in the respective housing for vertical adjustment relative thereto toward and away from the periphery of the cutterhead.

Each adjusting mechanism 66 includes a vertical internally threaded bore 68 through the end of the support member 62 and a vertically extending threaded rod or shaft that is disposed in and threadably received by the threadable bore 68. Each threaded rod is rotatably supported in its respective housing on a pair of upper and lower supports 72 and 74 adjacent the top and bottom edges of the openings 64, the supports 72 and 74 permitting rotation of the rod 70 while maintaining the axial position thereof so that rotation of the rod moves the end of the support member 62 upwardly or downwardly according to the direction of rotation of the rod due to the threaded connection between the rod and the support member. A seal element 76, preferably made of neophrene rubber or the like, has a circular opening 77 that tightly embraces the support member 62 and is fastened over the opening 64 by means of fasteners 78 to seal the housing while permitting vertical movement of the support member 62 relative to the housing. As is apparent, if the support member were moved upwardly from the position shown in FIG. 3, the lower portion of the seal would stretch while the upper portion would buckle or compress, while the opposite would occur if the support member were moved downwardly.

A transverse crankshaft 80 also extends between the opposite sides of the cutterhead housing above and parallel to the support member 62, the opposite ends of the crankshaft being journaled in the side walls of the housings 42 and 44 and being provided with appropriate seals to maintain the sealed condition of the housing, the right end of the crankshaft 80 being provided with a crank handle 82 adjacent the outer wall 49 of the right housing 42. Conventional worm gearing 84 connects the crankshaft 80 with each threaded rod 70 on the interior of the respective housings, the worm gearing including a wheel 85 on the upper end of the rod and a helix 86 on the crankshaft as is well known.

Mounted on the support member 62 between the opposite cutterhead housing side walls is a carrier 88 that is slidable along the support member between the opposite cutterhead housing side walls. The cylindrical outer surface of the support member 62 is machined to a smooth surface, and the carrier has a transverse bore 89 that receives the support member 62. A linear ball-type bearing 90 is disposed in the carrier bore 90 between the carrier and the support member 62. As is well known, such linear ball bearings include a relatively large number of balls that recirculate in longitudinally extending tracks, the bearings being retained in the longitudinal tracks by a nylon type retainer, such linear bearings being commercially available. The carrier includes a rearward extension 94 and a pair of spaced parallel plates 96 are fastened to the extension 94 by bolts 97 and extend rearwardly therefrom. The guide plates 96 are spaced apart approximately the same distance as the diameter of the guide shaft 60, which is received between the opposite guide plates so that the carrier is also slidable along the guide shaft and swingable about the axis of the shaft.

A generally horizontal plate 98 is fastened to the underside of the carrier 88 by a plurality of bolts 99 and is provided with a downwardly open recess 100 that spans the width of the carrier. A grinding stone 102 is elongated in a transverse direction and has a generally rectangular weight fore and aft cross section, the fore and aft dimension of which is slightly less than the fore and aft width of the recess 100, the stone 102 having essentially the same transverse dimension as the mounting plate 98 as shown in FIG. 7. The stone is permanently mounted in the recess 100 by a bonding material, indicated by the numeral 104, the bonding material being of a commercially available type such as 3M no. 2216 two-part adhesive and being applied to the entire mating surface between the top of the stone and the bottom of the recess in the mounting plate, a portion of the adhesive being allowed to squeeze out along the sides of the stone as illustrated in FIG. 4. As is apparent, the stone receives frequent impact from the knives during the sharpening process, and it has been found that bonding the stone to the mounting plate has been more satisfactory than the previously used clamping devices which set up a stress in the stone, which can cause shatter of the stone at the clamping point. Also, as is apparent, only the extreme upper portion of the stone is required for the bonding, whereas a clamping device would require a larger percent of the total height of the stone, so that the bonded stone can be worn away and used through a substantial portion of its overall height.

An elongated rod-like handle 105 has one end attached to the carrier extension by one of the guide plate mounting bolts 97 and extends parallel to the cutterhead axis through an opening 106 in the right housing 42, the handle terminating in a bent portion 107 to facilitate manipulation by the operator.

An interlock mechanism 108 is operative between the crankshaft 80 and the door 20 to prevent the lowering of the sharpening mechanism grinding stone into engagement with the cutterhead unless the door 20 is closed. The interlock includes a lever arm or locking member 109 extending through a slot 110 in the rear upright wall of the channel member 46, the forward portion of the lever arm and the slot 110 having a lesser width than the rearward portion visible in FIG. 2, so that the lever arm is insertible forwardly through the slot only as far as shown in FIG. 2. A spring 112 has its rearward end connected to the forward end of the lever arm and its forward end connected to the channel member to bias the lever arm forwardly, so that the arm is free to swing in a vertical arc about its fulcrum on the slot 110. The forward portion of the lever arm 109 has a vertical opening 114 and a pin or locking element 116 extends diametrically through the shaft 80 in alignment with the opening. As is apparent from FIG. 5, when the door is open, the spring 112 pulls the forward end of the lever arm downwardly so that the pin enters the opening 114 to prevent rotation of the shaft 80 in a clockwise direction as seen in FIG. 5. Since rotation of the shaft 80 in a clockwise direction causes lowering of the support member 62, when the door 20 is open, the support mechanism 62 and consequently the grinding stone cannot be lowered into engagement with the cutterhead. However, the slot is so disposed relative to the pin that counterclockwise rotation of the shaft raises the lever against the bias of the spring so that such counterclockwise rotation is permissible even when the door is open, so that the support member 62 can be raised or moved away from the cutterhead periphery even when the door is open. The door 20 is provided with a diagonal brace 118 across the upper rear corner of the door and a tab 120 projects downwardly from the brace 118. The tab 120 is aligned with the rearward end of the lever arm 109, so that when the door 20 is swung downwardly to its closed position, as shown in FIG. 6, the tab 120 engages the rearward end of the lever arm 109 to rock the forward end of the lever arm upwardly out of engagement with the lock pin 116 against the bias of the spring 112, so that the shaft 80 can be rotated in either direction. Of course, as soon as the door 20 is opened, the lever arm 109 again falls over the lock pin 116 to prevent lowering of the grinding stone.

In operation, the sharpening mechanism 40 is adjusted so that it clears the cutterhead while the machine is being utilized during the harvesting operation. If the operator desires to sharpen the cutterhead knives 26, he simply stops the machine and reverses the direction of rotation of the cutterhead as described in U.S. Pat. No. 3,677,316. The operator then rotates the crank handle 82 to rotate the crankshaft 80 and thereby rotate the threaded rods or shafts 70 in the opposite adjusting mechanism housings 42 and 44 via the worm gearing 66. As described above, clockwise rotation of the handle 82 causes the threaded rods or shafts 70 to rotate in a direction that causes the opposite ends of the support member 62 to move toward the cutterhead periphery. As also described above, the shaft 80 cannot be rotated in the direction necessary to bring the grinding mechanism into contact with the cutterhead unless the cutterhead housing door 20 is closed, ensuring that the operator will not attempt to sharpen the knives with the housing door open to expose himself to injury from either the rotating cutterhead or from the material removed from the knives.

As the support member 62 is lowered, it lowers the carrier 88 about the axis of the guide shaft 60, and when the stone 102 engages the edges of the knives 26, the operator starts to reciprocate the carrier 88 across the width of the cutterhead via the handle 105. As is apparent from FIG. 2, the outer portion 107 of the handle 105 is disposed at the right side of the cutter head housing immediately adjacent to the crank handle 82 so that it is easy for the operator to simultaneously manipulate both the crank handle 82 to lower the grinding stone into position and the handle 105 to reciprocate the stone across the width of the cutterhead.

As described above, the linear ball bearing 90 facilitates the reciprocation of the carrier on the support member even though it is exposed to a dirty environment. As also described, the housings 42 and 44 can be filled with lubricant so that the worm gearing and the threaded connection between the threaded rod 70 and the support member are fully lubricated and sealed from the contaminating environment, so the adjusting mechanism is easy to manually actuate via the crank handle 82. Thus, the sharpening mechanism is easy to operate and is also safe and durable.

I claim:

1. In a forage harvester having a cutterhead housing with opposite side walls and a door swingable between open and closed conditions to provide access to the housing interior, a rotary cutterhead mounted in the housing and having a plurality of knives with cutting edges generating a cylinder as the cutterhead rotates, and a knife sharpening mechanism mounted in the cutterhead housing and including an adjustable support structure and a sharpening element mounted on the support structure and shiftable therewith in opposite directions toward and away from the cutterhead periphery and means connected to the support structure for adjusting it in said opposite directions and including a rotatable element rotatable in first and second directions to respectively cause adjustment of the support structure toward and away from the cutterhead periphery, the improvement comprising:

a locking element on the rotary element;

a locking member mounted on the housing and shiftable between a first position wherein it is engageable with the locking element to prevent rotation of the rotatable element in at least the first direction and a second position wherein it clears the locking element;

and means operatively connecting the door to the locking member to shift the locking member to its second position only when the door is closed.

2. The invention defined in claim 1 and including biasing means operatively connected to the locking member for biasing it toward its first position.

3. The invention defined in claim 2 wherein the biasing means comprising a spring having one end connected to the locking member and the other end connected to the housing.

4. The invention defined in claim 3 wherein the locking member comprises a lever pivotally mounted on the housing, and the locking element extends radially from the rotary element adjacent one end of the lever and is engageable with the lever in the first position of the lever to prevent rotation of the rotary element in said first direction.

5. The invention defined in claim 4 wherein the locking element engages the lever to shift the lever to its second position when the rotatable element is rotated in its second direction.

6. The invention defined in claim 5 wherein the rotary element comprises a crank shaft axially parallel to the cutterhead axis adjacent the top of the cutterhead housing and the locking element comprises a pin extending radially from the shaft.

7. The invention defined in claim 1 wherein the locking element engages the locking member to prevent rotation of the rotary element only when the rotary element is rotated in its first direction.

8. The invention defined in claim 3 wherein the rotary element comprises a crank shaft axially parallel to the cutterhead axis adjacent the top of the cutterhead and the locking element comprises a pin extending radially from the shaft.

9. The invention defined in claim 3 wherein the means connecting the door to the locking member comprises a tab mounted on the inside of the door and engageable with the locking member only when the door is in its closed condition.

* * * * *